(12) United States Patent
Mackenzie (10) Patent No.: US 11,689,965 B2
(45) Date of Patent: Jun. 27, 2023

(54) FRONTHAUL PHYSICAL LAYER SPLIT IN A CELLULAR TELECOMMUNICATIONS NETWORK

(71) Applicant: British Telecommunications Public Limited Company, London (GB)

(72) Inventor: Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 17/596,459

(22) PCT Filed: May 7, 2020

(86) PCT No.: PCT/EP2020/062657
§ 371 (c)(1),
(2) Date: Dec. 10, 2021

(87) PCT Pub. No.: WO2020/249327
PCT Pub. Date: Dec. 17, 2020

(65) Prior Publication Data
US 2022/0312263 A1    Sep. 29, 2022

(30) Foreign Application Priority Data

Jun. 11, 2019 (EP) .................... 19179354

(51) Int. Cl.
*H04W 28/06* (2009.01)
*H04L 45/64* (2022.01)
(Continued)

(52) U.S. Cl.
CPC ............ *H04W 28/06* (2013.01); *H04L 45/64* (2013.01); *H04W 28/0236* (2013.01); *H04W 28/0278* (2013.01); *H04W 28/20* (2013.01)

(58) Field of Classification Search
CPC ..... H04W 28/20; H04W 28/06; H04W 24/00; H04W 28/0236; H04W 28/0278; H04L 45/64
See application file for complete search history.

(56) References Cited

U.S. PATENT DOCUMENTS 8,823,561 B1    9/2014   Hammer et al.
10,009,673 B1    6/2018   Liu et al.
(Continued)

FOREIGN PATENT DOCUMENTS

CN    107211435 A    9/2017
CN    108243493 A    7/2018
(Continued)

OTHER PUBLICATIONS

3GPP, 3GPP TS 36.104, "3rd Generation Partnership Project;Technical Specification Group Radio Access Network;Evolved Universal Terrestrial Radio Access (E-UTRA);Base Station (BS) radio transmission and reception (Release 15)," V15.4.0 (Sep. 2018), 299 pages.
(Continued)

*Primary Examiner* — Syed Ali
(74) *Attorney, Agent, or Firm* — Patterson Thuente, P.A.

(57) ABSTRACT

This disclosure provides a method of operating a base station in a cellular telecommunications network, the base station having a central base station unit and a distributed base station unit, wherein the central base station unit and distributed base station unit communicate over a fronthaul link, and the cellular telecommunications network further includes a User Equipment (UE) consuming a service via the base station in which communications between the central base station unit and UE utilize configurable error mitigation technique.

6 Claims, 4 Drawing Sheets

(51) Int. Cl.
  *H04W 28/02* (2009.01)
  *H04W 28/20* (2009.01)

(56) References Cited

U.S. PATENT DOCUMENTS

| | | | |
|---|---|---|---|
| 2007/0218863 | A1 | 9/2007 | Futatsugi et al. |
| 2013/0136214 | A1 | 5/2013 | Yamagishi |
| 2014/0282544 | A1* | 9/2014 | Smith .................. H04W 88/10 718/1 |
| 2016/0373283 | A1 | 12/2016 | Zeng et al. |
| 2017/0152982 | A1 | 6/2017 | Chuang |
| 2017/0265104 | A1 | 9/2017 | Arslan et al. |
| 2017/0373890 | A1* | 12/2017 | Fertonani ................ H04L 27/26 |
| 2018/0034669 | A1 | 2/2018 | Barbieri et al. |
| 2018/0124762 | A1 | 5/2018 | Zeng et al. |
| 2019/0281501 | A1 | 9/2019 | Berg et al. |
| 2019/0312664 | A1 | 10/2019 | Klautau et al. |
| 2020/0036488 | A1 | 1/2020 | Lim et al. |
| 2020/0036644 | A1* | 1/2020 | Belogolovy .......... H04L 1/0014 |
| 2020/0120458 | A1* | 4/2020 | Aldana .................. H04W 4/08 |
| 2021/0243713 | A1* | 8/2021 | Ellenbeck ......... H04W 56/0015 |
| 2021/0258988 | A1* | 8/2021 | Balakrishnan ......... G06N 3/088 |
| 2021/0297128 | A1* | 9/2021 | Badic ..................... H04B 7/088 |
| 2022/0070045 | A1 | 3/2022 | Berg et al. |

FOREIGN PATENT DOCUMENTS

| | | |
|---|---|---|
| CN | 110121854 A | 8/2019 |
| EP | 3443704 A2 | 2/2019 |
| EP | 3462623 A1 | 4/2019 |
| JP | 2002232427 A | 8/2002 |
| JP | 2011077795 A | 4/2011 |
| WO | WO-2014136193 A1 | 9/2014 |
| WO | WO-2015049013 A1 | 4/2015 |
| WO | WO-2016145371 A2 | 9/2016 |
| WO | WO-2017152982 A1 | 9/2017 |
| WO | WO-2018012873 A1 | 1/2018 |
| WO | WO-2019027711 A1 | 2/2019 |
| WO | WO-2019051869 A1 | 3/2019 |
| WO | WO-2019125241 A1 | 6/2019 |
| WO | WO-2019154507 A1 | 8/2019 |

OTHER PUBLICATIONS

3GPP TR 38.801 V14.0.0 "3rd Generation Partnership Project; Technical Specification Group Radio Access Network; Study on New Radio Access Technology: Radio Access Architecture and Interfaces (Release 14)," Mobile Competence Centre, 2017, pp. 1-91.
3GPP TR 38.801 V2.0.0 "3rd Generation Partnership Project; Technical Specification Group Radio Access Network; Study on New Radio Access Technology: Radio Access Architecture and Interfaces (Release 14)," 2017, pp. 1-90.
A. Sun et al., "XRAN Fronthaul Working Group Control, User and Synchronization Plane Specification," 2018, XP0556021, Retrieved from the internet: https://rod-stuhlmuller-nydh.squarespace.com/s/20180405-XRAN-FHCUS0-v0100.pdf, 61 Pages.
Combined Search and Examination Report under Section 17 and 18(3) for GB Application No. 1908302.1, dated Oct. 31, 2019, 7 pages.
Combined Search and Examination Report under Section 17 and 18(3) for GB Application No. 1908303.9, dated Nov. 7, 2019, 7 pages.
Dotsch U., et al., "Quantitative Analysis of Split Base Station Processing and Determination of Advantageous Architectures for LTE," 2013, Bell labs Technical Journal vol. 18 No. 1, 24 pages.
Extended European Search Report for Application No. 19179353.8, dated Nov. 20, 2019, 10 pages.
Extended European Search Report for Application No. 19179354.6, dated Nov. 20, 2019, 11 pages.
Extended European Search Report for Application No. 20215151.0, dated Mar. 10, 2021, 7 pages.
Extended European Search Report for EP Application No. 20160023.6 dated Sep. 14, 2020, 7 pages.
International Preliminary Report on Patentability for Application No. PCT/EP2020/062657, dated Apr. 26, 2021, 12 pages.
International Search Report and Written Opinion for Application No. PCT/EP2020/062656, dated Jul. 17, 2020, 14 pages.
International Search Report and Written Opinion for Application No. PCT/EP2020/062657, dated Jul. 15, 2020, 15 pages.
NGMN, "NGMN Overview on 5G RAN Functional Decomposition," NGMN Alliance, Version. 1.0, Feb. 2018, 48 pages.
NGMN, "Nokia EVM Bitwidth Contribution," 5 pages.
Office Action for GB Application No. 2002840.3, dated Aug. 3, 2020, 4 pages.
Office Action for Japanese Application No. 2021-001549, dated Apr. 13, 2021, 4 pages.
Office Action for Korean Application No. 10-2021-0002001, dated May 10, 2021, 2 pages.
Ranaweera C. et al., "5G C-RAN Architecture: A Comparison of Multiple Optical Fronthaul Networks," 2017, International Cvonference on Optical Networks Design and Modeling (ONDM), IFIP, May 15, 2017 (May 15, 2017), XP033107942,(retrieved on Jun. 23, 2017) *chapter III,A* pp. 1-6.
Vu T.X., et al., "Adaptive Cloud Radio Access Networks: Compression and Optimization," IEEE Transactions on Signal Processing, vol. 65, No. 1, Jan. 1, 2017, pp. 228-241(15 pages).
XRAN, "xRAN Fronthaul Working GroupControl, User and Synchronization Plane Specification," XRAN-FH.CUS.0-v02.00, Technical Specification, Jul. 20, 2018, 156 pages.
Examination Report for Indian Application No. 202114007692, dated Mar. 31, 2022, 6 pages.
Examination Report for Indian Patent Application No. 202117058104, dated Sep. 29, 2022, 6 pages.
First Indian Examination Report on Indian Application No. 202117058108 dated Oct. 25, 2022, 7 pages.
First Office Action for Japanese Application No. 2021-573534, dated May 17, 2022, 2 pages.
Guo B., et al., "CPRI Compression Transport for LTE and LTE-A Signal in C-RAN", Aug. 1, 2012, 7th International ICST Conference on Communications and Networking in China (CHINACOM), 7 pages.
International Preliminary Report on Patentability for Application No. PCT/EP2020/062656, dated Dec. 23, 2021, 10 pages.
Office Action and Search Report for Chinese Application No. 202110054983.7, dated Feb. 9, 2022, 6 pages.
Office action for Japanese Application No. 2021-573532, dated Jul. 26, 2022, 4 pages.
Office action for Japanese Application No. 2021-573534, dated Sep. 6, 2022, 4 pages.
"O-RAN Fronthaul Working Group Control, User and Synchronization Plane Specification", 2019, ORAN-WG4.CUS.0-v02.00, Technical Specification, 218 pages.
Rohde & Schwarz, "The Effective Number of Bits (ENOB) of my R&S Digital Oscilloscope—Technical Paper", Apr. 2011, 17 pages.

\* cited by examiner

FRONTHAUL PHYSICAL LAYER SPLIT IN A CELLULAR TELECOMMUNICATIONS NETWORK

PRIORITY CLAIM

The present application is a National Phase entry of PCT Application No.PCT/EP2020/062657, filed May 7, 2020, which claims priority from EP Patent Application No. 19179354.6, filed Jun. 11, 2019, each of which is hereby fully incorporated herein by reference.

TECHNICAL FIELD

The present disclosure relates to a cellular telecommunications network.

BACKGROUND

A cellular telecommunications network may comprise a core network, a radio access network and a plurality of User Equipment (UE). Each UE may access the core network (and any onward connection from the core network such as to the Internet) via the radio access network. A base station is an example of a radio access network node. The base station implements several functions known as baseband processing. In an example, baseband processing includes the PHYsical-layer (PHY) layer functions, Medium Access Control (MAC) layer functions, Radio Link Control (RLC) layer functions, Packet Data Convergence Protocol (PDCP) layer functions, and Radio Resource Control (RRC) layer functions.

In modern cellular telecommunications networks implementing a Centralized Radio Access Network (C-RAN), base station functionality may be divided into several (typically two) components (either physically if implemented in hardware or logically if implemented in a software defined network). These two components are commonly known as the Central Unit (CU) and Distributed Unit (DU), although other terminology (such as BaseBand Unit (BBU) and Remote Radio Unit (RRU)) may be used. The CU and DU are connected by a fronthaul link, which may be a wireless or wired (typically optical fiber) connection. The DU implements at least a set of Radio Frequency (RF) functions (e.g. analog to digital and digital to analog conversion) and optionally one or more baseband processing functions. The remainder of the baseband processing functions are implemented in the CU. The split of functions between the CU and DU is known as the "functional split".

There are advantages and disadvantages to the choice of functional split when the CU is connected to a plurality of DUs. That is, as more functions are implemented in the CU (so that fewer functions are implemented in the DU) then the processing requirements for the DU are reduced and the CU may improve coordination across the plurality of DUs. However, such implementations generally have more stringent fronthaul requirements, such as greater capacity and lower latency.

One possible functional split is known as the intra-PHY split, in which the RF and lower-PHY functions are implemented in the DU and all remaining functions are implemented in the CU. In this implementation, the CU and DUs communicate In-Phase and Quadrature (IQ) samples over the fronthaul connection.

SUMMARY

According to a first aspect of the disclosure, there is provided method of operating a base station in a cellular telecommunications network, the base station having a central base station unit and a distributed base station unit, wherein the central base station unit and distributed base station unit communicate over a fronthaul link, and the cellular telecommunications network further includes a User Equipment (UE) consuming a service via the base station in which communications between the central base station unit and UE utilize a configurable error mitigation technique, the method comprising: communicating samples over the fronthaul link at a first bit width; determining that a latency measure, or derivative thereof, of the service satisfies a threshold; and, in response, reconfiguring the samples to use a second bit width, wherein the first bit width is different to the second bit width, and reconfiguring the error mitigation technique; communicating samples over the fronthaul link at the second bit width; and communicating between the central base station unit and UE using the reconfigured error mitigation technique.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a central base station unit for a cellular telecommunications network, wherein the cellular telecommunications network includes a User Equipment (UE) consuming a service via the central base station unit, wherein communications between the central base station unit and UE utilize a configurable error mitigation technique, the base station unit comprising: a transceiver configured to communicate samples over a fronthaul link with a distributed base station unit at a first bit width and with the UE using the error mitigation technique; and a processor configured to determine that a latency measure, or derivative thereof, of the service satisfies a threshold; and, in response, reconfigure the samples to use a second bit width, wherein the first bit width is different to the second bit width, and reconfigure the error mitigation technique, wherein, following reconfiguration, the transceiver is configured to communicate samples over the fronthaul link at the second bit width and communicate with the UE using the reconfigured error mitigation technique.

Upon determining that the latency measure, or derivative thereof, of the service is more than the threshold, then the second bit width may have more bits per sample than the first bit width. Alternatively, upon determining that the latency measure, or derivative thereof, of the service is less than the threshold, then the second bit width may have fewer bits per sample than the first bit width.

Reconfiguring the error mitigation technique may include switching between a first state, in which the error mitigation technique is active, and a second state, in which the error mitigation technique is inactive.

The samples may be In-Phase and Quadrature (IQ) samples.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
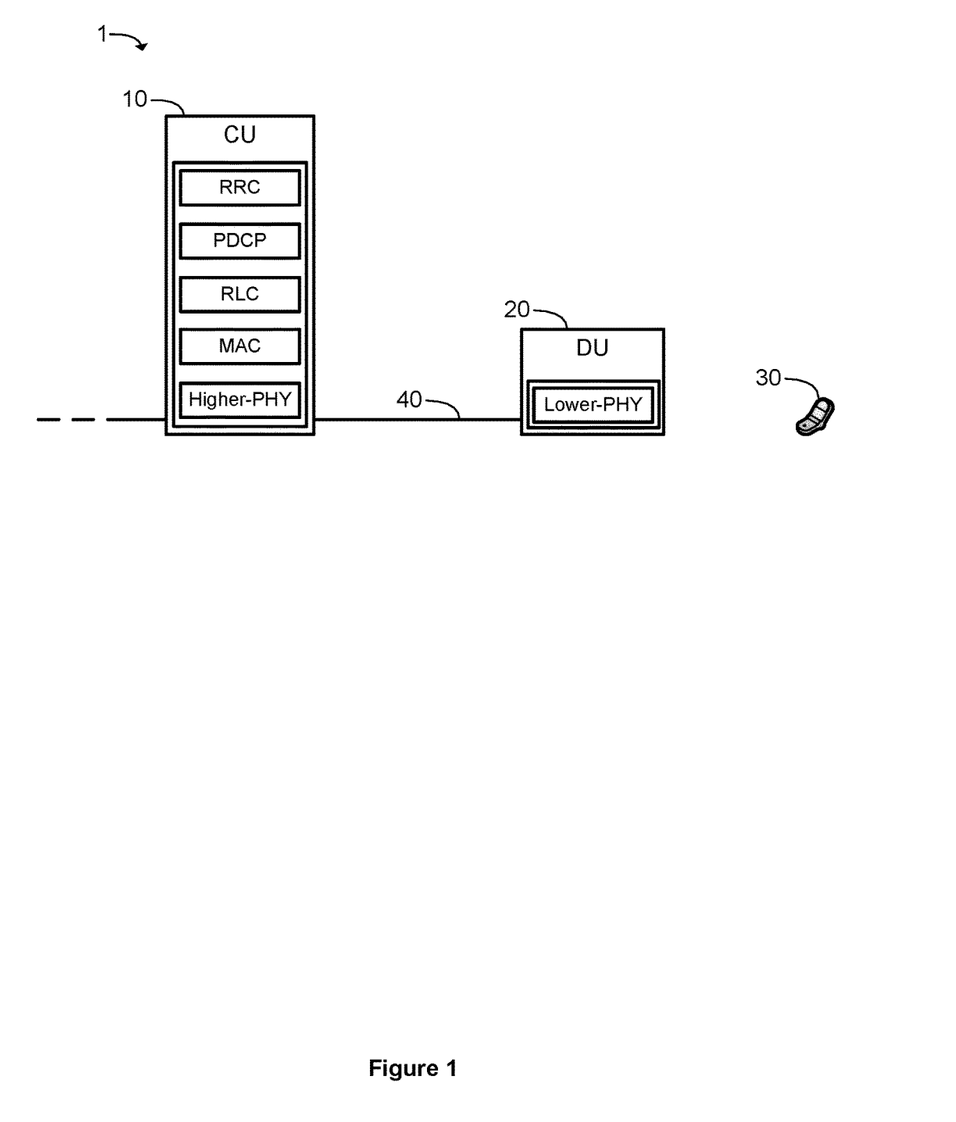
FIG. 1 is a schematic diagram of an embodiment of a cellular telecommunications network of the present disclosure.

A first embodiment of a cellular telecommunications network of the present disclosure will now be described with reference to FIGS. 1 to 3. FIG. 1 illustrates a Centralized Radio Access Network (C-RAN) 1 including a Central Unit (CU) 10, a Distributed Unit (DU) 20 and a User Equipment (UE) 30. The CU 10 and DU 20 are connected by a fronthaul link 40.

Figure 2:
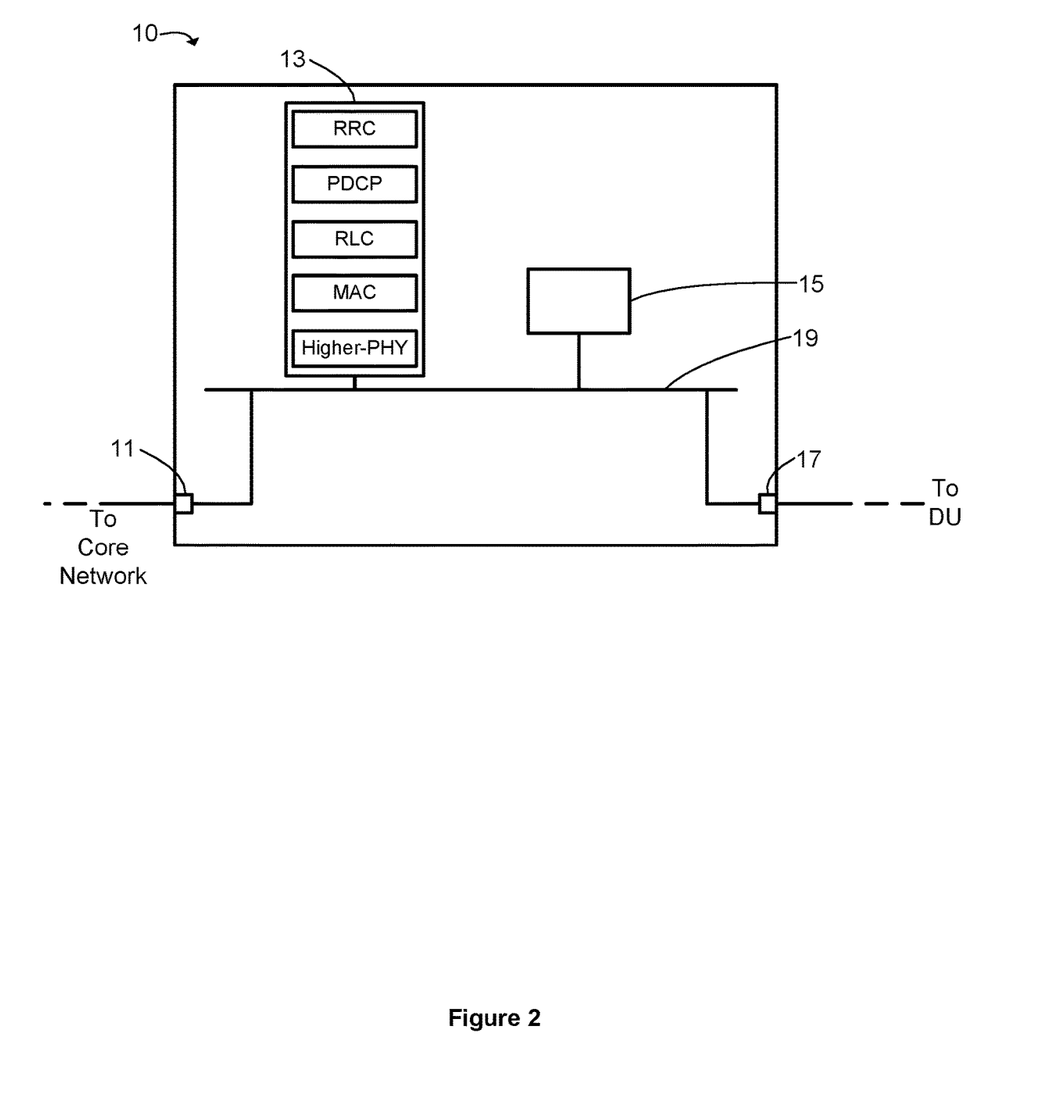
FIG. 2 is a schematic diagram of a central base station unit of the network of FIG. 1.

The CU 10 is shown in more detail in FIG. 2. The CU 10 includes a first communications interface 11 for connecting the CU 10 to the cellular core network (via a backhaul link), a processor 13, memory 15, a second communications interface 17 for connecting the CU 10 to the DU 20 (via the fronthaul link 40), all connected via bus 19. In this embodiment, the first communications interface 11 is an optical fiber interface for connecting the CU 10 to an optical fiber backhaul link, and the second communications interface 17 is also an optical fiber interface for connecting the CU 10 to an optical fiber fronthaul link. However, the skilled person will understand that other forms of backhaul and fronthaul links are possible, such as another form of wired connection (e.g. xDSL) or a form of wireless connection (e.g. operating according to a cellular telecommunications protocol).

Figure 3:
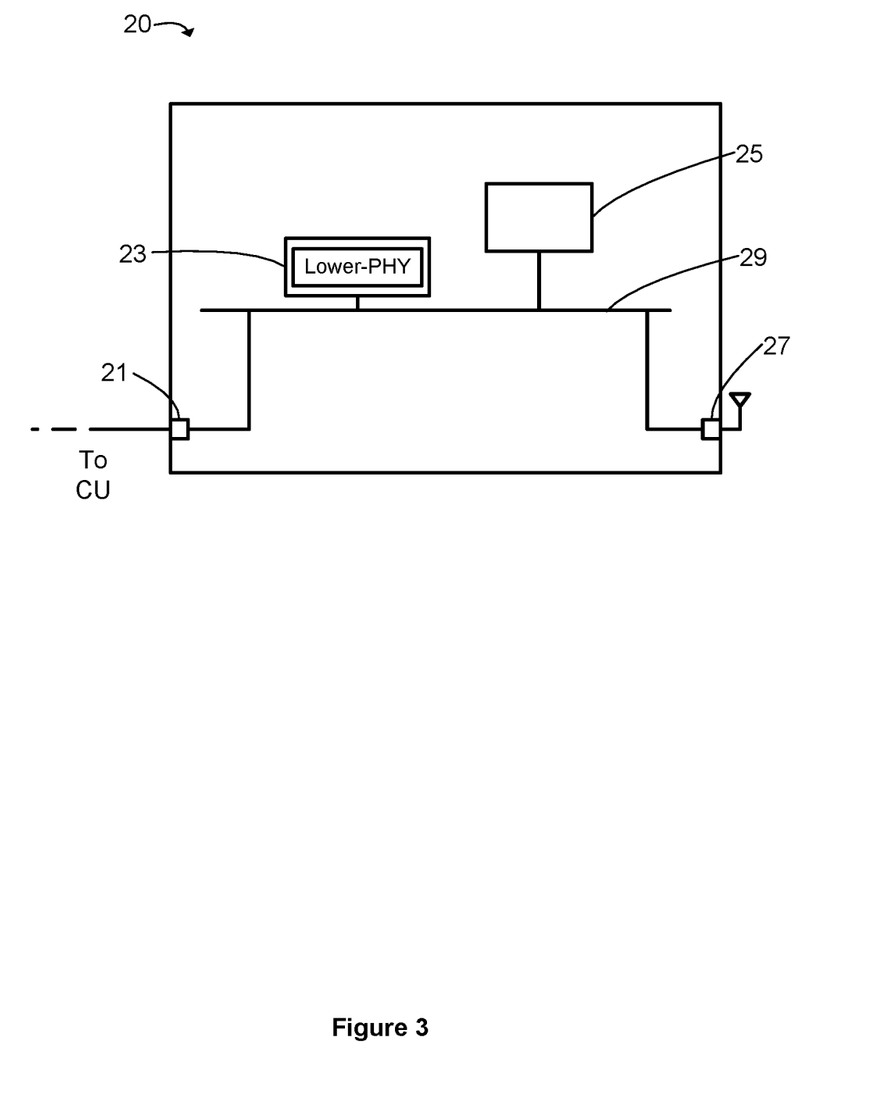
FIG. 3 is a schematic diagram of a distributed base station unit of the network of FIG. 1.

The DU 20 is shown in more detail in FIG. 3. The DU 20 includes a first communications interface 21 for connecting the DU 20 to the CU 10 via the fronthaul link 40, a processor 23, memory 25, and a second communications interface 27 for connecting the DU 20 to the UE 30 via an access link. In this embodiment, the second communications interface 27 is an interface to an antenna for wireless communications with the UE 30.

Turning back to FIG. 1, it is shown that the CU 10 and DU 20 perform different functions of the cellular telecommunications protocol. In this embodiment, the DU 20 performs Radio Frequency (RF) functions (not shown) and lower PHYsical (PHY) layer functions, whilst the CU 10 performs all higher layer functions including the higher PHY layer functions, Medium Access Control (MAC) functions, Radio Link Control (RLC) functions and Packet Data Convergence Protocol (PDCP) functions. This is known as an intra-PHY functional split. In this arrangement, the CU 10 and DU 20 communicate using frequency domain In-Phase and Quadrature (IQ) samples, transmitted over the fronthaul link 40.

xRAN Fronthaul Working Group Technical Specification "Control, User and Synchronization Plane Specification" v02.00 specifies (in Annex D) various IQ sample structures in which the number of bits used in each IQ sample varies. The number of bits in an IQ sample is known as the "bit width". These IQ sample bit widths range from 6 to 16 bits (inclusive). These different IQ sample bit widths are achievable using different compression levels. That is, the IQ sample may use a greater compression level to achieve relatively fewer bits per sample instead of a lower compression level to achieve relatively more bits per sample. Annex A of the above xRAN specification defines different compression techniques that may be used. The respective processors 13, 23 of the CU 10 and DU 20 are able to implement one or more of these compression techniques to achieve any one of the available bit widths.

A performance of a receiver or transmitter may be defined by its Error Vector Magnitude (EVM) parameter. The error vector is a vector in the I-Q plane between an ideal constellation point and a measured signal. The average amplitude of the error vector, normalized to peak signal amplitude, is the EVM. 3GPP Technical Specification 36.104 "Evolved Universal Terrestrial Radio Access (E-UTRA); Base Station (BS) radio transmission and reception" defines, in section 6.5.2 disclosure, several EVM requirements for E-UTRA carriers as:

TABLE 1

EVM Requirements for E-UTRA Carrier

| Modulation scheme | Required EVM [%] |
|---|---|
| QPSK | 17.5% |
| 16QAM | 12.5% |
| 64QAM | 8% |
| 256QAM | 3.5% |
| 1024QAM | 2.5% |

Table 1 illustrates that higher order modulation schemes require improved EVM performance (in which a lower EVM percentage corresponds with improved EVM performance). Furthermore, table 1 illustrates that there is a minimum EVM for each Modulation and Coding Scheme (MCS).

The following description relates to the transmitter EVM. However, it is noted that the receiver EVM is also measurable and contributes to a reduction in Signal-to-Interference-and-Noise-Ratio (SINR). That is, the effect of bit width for uplink traffic can also be considered as a quantization effect, where reduced bit width can degrade the effective Signal-to-Interference-and-Noise-Ratio (SINR) of the received signal.

Figure 4:
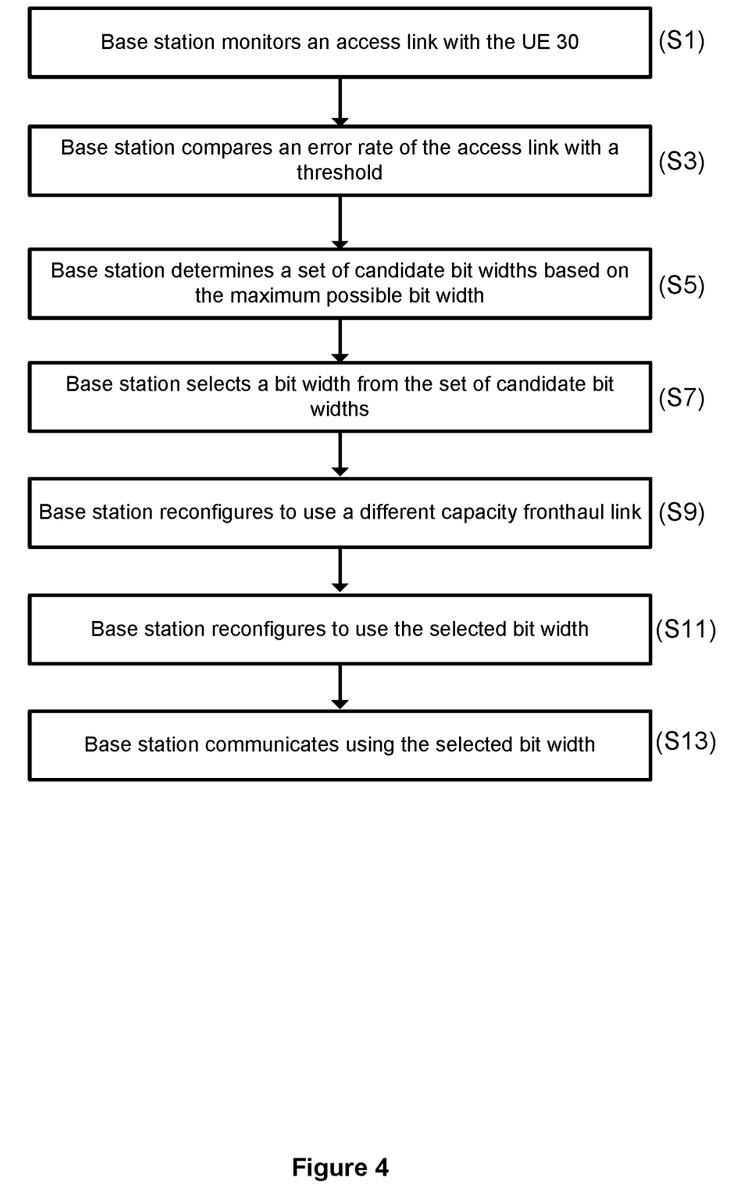
FIG. 4 is a flow diagram of an embodiment of a method of the present disclosure.

A first embodiment of a method of the present disclosure will now be described with reference to FIGS. 1 and 4. In this embodiment, the cellular telecommunications network 1 is arranged as shown in FIG. 1 and the CU 10 and DU 20 communicate using IQ samples having 6 bits per sample (the smallest number of bits per sample according to the XRAN specification noted above) and thus use the highest compression level. In this starting scenario, the UE 30 is consuming a service from the cellular core network so that traffic for this service is transmitted between the UE 30 and cellular core network via the CU 10, DU 20 and the fronthaul link 40.

In this embodiment, the CU 10 and DU 20 utilize a fronthaul link 40 that has an initial capacity that supports the current traffic for the service. However, the CU 10 and DU 20 may vary this capacity by switching from a low capacity configuration (for example, using 100 Mb/s Ethernet) to a high capacity configuration (for example, using a 1 Gb/s Ethernet). In this starting scenario, the fronthaul link 40 is using the low capacity configuration and therefore only a proportion of its potential capacity.

In S1 of this embodiment, the CU 10 monitors the access link to the UE 30 to determine the error rate for the traffic for the service. The error rate may be a single measurement of the error rate at a particular layer of the protocol stack, or a set of measurements of the error rate at a plurality of layers of the protocol stack.

In S3, the error rate between the CU 10 and UE 30 is compared to a threshold. This threshold is based upon the particular service being consumed by the UE 30, so that if the service requires, for example, a physical layer block error rate of no more than 10%, then an error rate less than 10% will satisfy this threshold. The threshold may also be based on other layers of the protocol, such as a MAC layer block error rate of no more than 0.1% or and RLC layer block error rate of no more than 0.0001%.

In an example scenario, the RF environment between the DU 20 and UE 30 degrades such that the error rate between the DU 20 and UE 30 increases above the threshold. This degradation may be due to, for example, an obstacle moving between the DU 20 and UE 30. In conventional approaches, this event may be used as a trigger for the CU 10 to switch from its current MCS to another. However, in this embodiment, the CU 10 does not switch MCS (because, for example, it is already using the most robust MCS) but instead implements the following.

In S5, the CU 10 determines the maximum bit width (that is, a maximum number of bits per sample) possible. In this embodiment, this determination is based on:
 for the downlink, the maximum bit-width of the inverse Fast Fourier Transform (iFFT) and the accuracy of both the power amplifier and the digital to analog converter; and,
 for the uplink, the maximum bit-width of the FFT, the accuracy of both the analog to digital converter and receiver sensitivity.

In this example, the CU 10 determines that the maximum bit width is 9 bits per sample. Therefore, the fronthaul link 40 may use any one of 6, 7, 8 or 9 bits per sample. In S7, the CU 10 then selects a bit width from these candidate bit widths based on:
 1. a comparison of the expected capacity requirements for the fronthaul link 40 when using the candidate bit width to the fronthaul link's capacity when operating under its high capacity configuration; and
 2. a comparison of an expected error rate when using the candidate bit width to the error rate threshold for the service (known from certification and/or calibration data).

The expected capacity requirements may be calculated as:

$$R_t = \sum_{l=1}^{L_t} Q \cdot PRB_t^l$$

Where $R_t$ is the instantaneous user plane rate for Transmission Time Interval (TTI) t; $PRB_t^l$ is the number of Phsyical Resource Blocks (PRBs) scheduled in layer l at time t; Q is the number of bits per PRB; and $L_t$ is the number of co-scheduled UEs at time t.

The CU 10 then selects a candidate bit width which has an expected capacity requirement that is greater than the current capacity of the fronthaul link 40 (but within the potential capacity of the fronthaul link 40 when operating under its high capacity configuration) and has an expected error rate that is below the error rate threshold used in S3 (plus, optionally, a margin). In this example, the selected bit width is 8 bits per sample.

In S9, the CU 10 and DU 20 cooperate to increase the capacity of the fronthaul link 40 by switching to the high capacity configuration. In this example, this is achieved by switching from a 100 Mb/s Ethernet connection to a 1 Gb/s Ethernet connection. This may also include an admission control function to remove resources being used by traffic of other services being transmitted over the fronthaul link 40 and reallocate them to the service.

Following reconfiguration to increase the capacity of the fronthaul link 40, in S11, the CU 10 and DU 20 increase the bit width of the IQ samples to 8 bits per sample. This is achieved by using a lower compression level for the IQ samples. In S13, the CU 10 and DU 20 communicate using IQ samples having the new bit width.

In conventional approaches, a CU 10 may respond to a worsening RF environment by improving the quality of the symbols used in the transmission by modifying the MCS. As shown in table 1 above, a change to a more robust MCS (that is, one in which each symbol represents fewer bits) improves the EVM performance and thus improves the error rate. However, it may not always be appropriate to switch to a more robust MCS, such as when the access link between the DU 20 and the UE 30 is already using the most robust scheme (either theoretically or based on the service constraints). In this embodiment of the disclosure, the DU 20 responds to the worsening RF environment by both increasing the bit width of the IQ sample and increasing the capacity of the fronthaul link 40 to accommodate the corresponding increased fronthaul capacity requirement. The effect of increasing the bit width of the IQ sample is to improve the EVM performance, so that the DU 20 may maintain its current MCS whilst maintaining an acceptable error rate. Accordingly, the UE 30 may continue to consume the service in the degraded RF environment whilst maintaining an acceptable error rate. This embodiment of the disclosure is therefore particularly suitable for high reliability services operating over a cellular telecommunications network, such as autonomous driving services. This embodiment is also particularly suitable for control data communication, which should typically be more reliable than user data.

The process then loops back to S1 such that the DU 20 monitors the error rate of the service and, in S3, compares the error rate to a threshold. In this second iteration of the method of this embodiment, the error rate falls below the threshold. In conventional approaches, this would typically be used as a trigger to switch the service to a less robust MCS (which would therefore use more bits per symbol and therefore increase capacity utilization of the link for the service). However, in this second iteration, this event is used as a trigger to change the bit width and, possibly, reduce the capacity of the fronthaul link 40 by switching to its low capacity configuration.

In S5 of this second iteration, the DU 20 determines the minimum possible bit width, and, in S7, the DU 20 selects a reduced bit width based on:
 1. a comparison of the expected capacity requirements of the fronthaul link 40 when using the candidate bit width to the fronthaul link's capacity when using its low capacity configuration; and
 2. a comparison of an expected error rate when using the candidate bit width to the error rate threshold for the service.

In this example, the DU 20 selects a reduced bit width of 7 bits per sample, which has both an expected error rate that satisfies the error rate threshold for the service and has an expected capacity requirement that would allow the fronthaul to switch to the low capacity configuration.

In S9, the DU 20 and CU 10 cooperate to switch to the low capacity configuration and, in S11, the CU 10 and DU 20 decrease the bit width of the IQ samples to 7 bits per sample. In S13, the CU 10 and DU 20 communicate using IQ samples having the new bit width. In doing so, the additional fronthaul capacity that has now become redundant (e.g. due to the RF environment improving such that the increased bit width is no longer necessary) is no longer being used. This reduces the energy requirements of operating the CU 10 and DU 20, and releases those resources to be used by another entity.

In the above embodiments, the process of reconfiguring the bit width of the IQ samples and the capacity of the fronthaul link is triggered upon detection of a changing RF environment (or at least by a derivative measurement such as a changing error rate). However, the skilled person will understand that this is not essential, and other triggers may be used. For example, the process may be triggered upon the UE 30 requesting a new service, or an existing service being reclassified, whereby the requirements of the new or reclassified service exceed the resources of the fronthaul link 40.

In one implementation, it is possible to implement the above embodiment for traffic for a particular service (e.g. the traffic for the new or reclassified service) instead of traffic for all services. Accordingly, the traffic for different services may be of different bit widths.

Furthermore, in the above embodiment, the fronthaul link 40 is an optical fiber connection having a low capacity configuration and a high capacity configuration. However, the skilled person will understand that other forms of connection may be used having multiple capacity configurations. For example, the fronthaul link may be based on a wireless connection and the capacity may be modified by enabling/disabling antennae or switching to a different communications protocol. Furthermore, it is not essential that there is a single fronthaul connection between the CU 10 and DU 20 having multiple capacity configurations. Instead, the CU 10 and DU 20 may have a multipath fronthaul connection (e.g. using multiple optical fibers between the CU 10 and DU 20 or multiple connections between the CU 10 and DU 20 of different forms) and the capacity may be modified by using a different number of these connections.

In the second iteration of the above embodiment, the selected bit width was one that resulted in a reconfiguration of the capacity of the fronthaul link 40. However, the CU 10 may take a conservative approach in which the bit width is reduced in relatively small increments (compared to the increments used when increasing the bit width in the first iteration) which would not immediately permit a change in capacity of the fronthaul for several iterations. This provides some protection for a high reliability service in case the predicted error rate following a reduction in bit width is too optimistic.

In the above embodiment, the CU estimated the capacity requirements of a candidate bit width and compared the estimated capacity requirement to the potential capacity of the fronthaul link when using a particular capacity configuration. However, the skilled person will understand that this comparison may be a function of the potential capacity of particular capacity configuration (e.g. 90% of the potential capacity), such that any subsequent reconfiguration does not use an unfair proportion of resources of the fronthaul link.

A second embodiment of a method of the present disclosure will now be described. This embodiment utilizes the same CU 10, DU 20 and UE 30 as the first embodiment, and the CU 10 and DU 20 again use an intra-PHY split such that communications between the CU 10 and DU 20 use IQ samples (initially at a bit width of 6 bits per sample). However, in this second embodiment, communications between the CU 10 and UE 30 also utilize Automatic Repeat reQuest (ARQ), an example of an error mitigation technique which may be selectively applied by the respective processors of the CU 10 and UE 30 between a first state in which ARQ is applied to communications and a second state in which ARQ is not applied to communications. ARQ is a service specific error mitigation technique that is enabled in the RLC layer of the CU 10 and UE 30 for a service that requires a particular error rate. ARQ operates by the receiving node requesting a retransmission from a sending node of a data packet that is either not received within a particular time period or that is received but cannot be decoded. In response, the receiving node requests a retransmission of that data packet by sending a feedback message to the sending node. This delay (in sending the feedback message to the sending node and the sending node retransmitting the data packet) introduces a delay to the overall transmission which results in increased latency. Accordingly, the ARQ technique is used to improve reliability, but degrades latency.

In this embodiment, the CU 10 monitors communications between the CU 10 and UE 30 for the service to determine whether a latency metric (either the latency or some derivative of latency, such as a count of retransmissions) satisfies a threshold. If the latency surpasses this threshold, then the CU 10 reacts in the following manner. Firstly, the CU 10 and DU 20 cooperate to increase the bit width of IQ samples communicated over the fronthaul link. This is implemented in a similar manner as described above for the first embodiment, in which the CU 10 identifies a maximum bit width (based on the current capacity of the fronthaul link and the expected error rate of each bit width) to identify a set of candidate bit widths (e.g. 8 bits per sample), selects one of these candidate bit widths, and cooperates with the DU 20 to increase the bit width of communications over the fronthaul link to this selected bit width. Secondly, the CU 10 and UE 30 cooperate to disable ARQ. This is implemented by the respective processors of the CU 10 and UE 30 switching from the first state to the second state.

Although the order of events (disabling ARQ and switching bit width) is non-essential, it is noted that it is preferable to switch bit width before disabling ARQ. This would increase the error rate performance in between the events, but would come at an increased resource utilization penalty. It would also be possible to disable ARQ before switching bit width (for example if resource utilization is already at or near maximum), but this may lead to an increased error rate in between the events. It is possible to implement the two processes simultaneously, although inter-layer traffic must be considered (for example by applying an offset).

The effect of increasing the bit width of communications over the fronthaul link is to reduce the overall error rate of communications for the service. Accordingly, ARQ becomes redundant as an error mitigation technique, and so this technique is switched off and communications for the service no longer suffer from latency degradation caused by ARQ retransmissions. In effect, this second embodiment reacts to the trigger of latency increasing above a threshold by substituting a higher-layer error mitigation technique (ARQ) with a lower-layer error mitigation technique (increasing bit width), in which the lower-layer error mitigation technique offers improved latency performance over the higher-layer error mitigation technique. Accordingly, this second embodiment is particularly applicable to low latency (and high-reliability, low latency) services.

Following this reconfiguration, the CU 10, DU 20 and UE 30 continue to monitor the latency of communications for the service and if the latency improves (e.g. satisfying a threshold) then these nodes may revert to their original configuration by reducing the bit width of communications over the fronthaul link and switching ARQ on again. This reduces fronthaul utilization as the communications at the lower bit width require fewer resources.

Although ARQ is used as an example, the skilled person will understand that this is not essential. That is, there are many other error mitigation techniques that may be subject to the steps of this second embodiment. In other embodiments utilizing the same protocol stack, the error mitigation technique may be Hybrid ARQ (implemented in the MAC layer), in which the trigger could be (for example) based on the count of retransmissions for a successful transmission and the reconfiguration would be to reduce the limit on the number of retransmissions for each data packet. In another embodiment, the error mitigation technique may be Transport Control Protocol (TCP) retransmission (implemented in the IP layer), in which the trigger would be a count of retransmissions for a successful transmission and the reconfiguration would be to switch from TCP to the User Datagram Protocol (UDP). Other error mitigation techniques may apply for other protocol stacks.

Furthermore, the skilled person will understand that it is not essential for the trigger to be a direct measure of latency. That is, the trigger may be based on a derivative of latency, such as a count of retransmissions or another measure linked to latency. That is, the definitions of latency and error rate are linked (as error rate is a measure of the number of data packets that don't successfully arrive in a particular time period), so a threshold based on error rate could also be used as a trigger. Furthermore, the trigger may be based on the service changing its latency requirements so that they are no longer satisfied by the current latency measurements.

The skilled person will understand that the methods of the first and second embodiments may be combined, so that the three reconfigurations (changing bit width, changing fronthaul capacity, and changing a higher-layer error mitigation configuration) could all be used in parallel. This would be highly applicable to high-reliability, low latency services.

In the above embodiments, the base station implements one or more compression techniques from the XRAN specification in order to vary the bit width from 6 bits per sample to 16 bits per sample. However, this is only an example and other compression techniques may be used and other bit widths may be used.

Furthermore, in the above embodiments, the method is implemented in the CU 10. However, the skilled person will understand that the method may be implemented in the DU 20 either exclusively or in combination with the CU 10 (with appropriate additional messages between the CU 10 and DU 20 to communicate the necessary data). Furthermore, the skilled person will understand that some or all of the operations of the method may be implemented in a separate node to the base station, such as in an XRAN controller with a connection to the CU 10 and/or DU 20.

The skilled person will understand that any combination of features is possible within the scope of the invention, as claimed.

The invention claimed is:

1. A method of operating a base station in a cellular telecommunications network, the base station having a central base station unit and a distributed base station unit, wherein the central base station unit and the distributed base station unit communicate over a fronthaul link, and the cellular telecommunications network further includes a User Equipment (UE) consuming a service via the base station in which communications between the central base station unit and the UE utilize a configurable error mitigation technique, the method comprising:

communicating In-Phase and Quadrature (IQ) samples over the fronthaul link at a first bit width;
determining that a latency measure, or a derivative of a latency measure, of the service satisfies a threshold; and, in response,
reconfiguring the IQ samples to use a second bit width, wherein:
when it is determined that the latency measure, or the derivative of the latency measure, of the service is more than the threshold, then the second bit width has more bits per sample than the first bit width, and
when it is determined that the latency measure, or the derivative of the latency measure, of the service is less than the threshold, then the second bit width has fewer bits per sample than the first bit width;
reconfiguring the error mitigation technique, wherein the error mitigation technique is based on one or more layers of a protocol stack;
communicating the IQ samples over the fronthaul link at the second bit width; and
communicating between the central base station unit and the UE using the reconfigured error mitigation technique.

2. The method as claimed in claim 1, wherein reconfiguring the error mitigation technique includes switching between a first state, in which the error mitigation technique is active, and a second state, in which the error mitigation technique is inactive.

3. A computer program product comprising instructions which, when the computer program is executed by a computer, cause the computer to carry out the method of claim 1.

4. A non-transitory computer-readable data carrier having stored thereon the computer program of claim 3.

5. A central base station unit for a cellular telecommunications network, wherein the cellular telecommunications network includes a User Equipment (UE) consuming a service via the central base station unit, wherein communications between the central base station unit and the UE utilize a configurable error mitigation technique, the central base station unit comprising:

a transceiver configured to communicate In-Phase and Quadrature (IQ) samples over a fronthaul link with a distributed base station unit at a first bit width and with the UE using the error mitigation technique; and
a processor configured to:
determine that a latency measure, or a derivative of a latency measure, of the service satisfies a threshold; and, in response,
reconfigure the IQ samples to use a second bit width, wherein:
when it is determined that the latency measure, or the derivative of the latency measure, of the service is more than the threshold, then the second bit width has more bits per sample than the first bit width, and
when it is determined that the latency measure, or the derivative of the latency measure, of the service is less than the threshold, then the second bit width has fewer bits per sample than the first bit width; and
reconfigure the error mitigation technique, wherein the error mitigation technique is based on one or more layers of a protocol stack,
wherein, following the reconfiguration, the transceiver is configured to communicate the IQ samples over the fronthaul link at the second bit width and communicate with the UE using the reconfigured error mitigation technique.

6. The method as claimed in claim 5, wherein the processor is configured to reconfigure the error mitigation technique by switching between a first state, in which the error mitigation technique is active, and a second state, in which the error mitigation technique is inactive.

\* \* \* \* \*